R. E. SMITH.
CLEVIS HOOK.
APPLICATION FILED APR. 24, 1912.
1,054,046.
Patented Feb. 25, 1913.
Fig. 1.
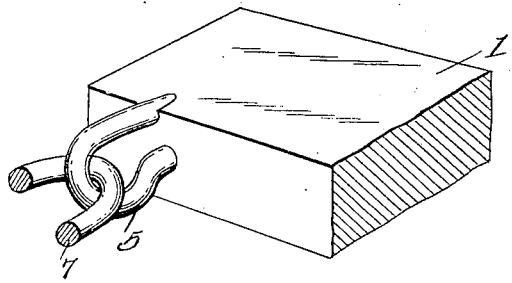
Fig. 2.
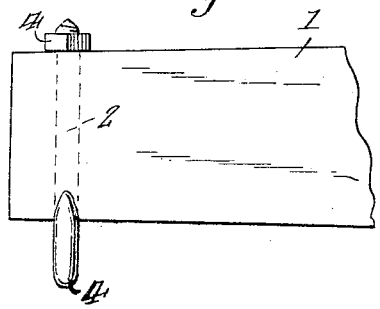
Fig. 3.
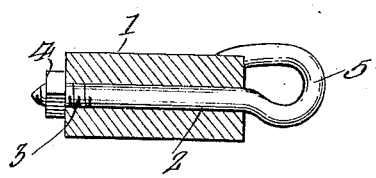
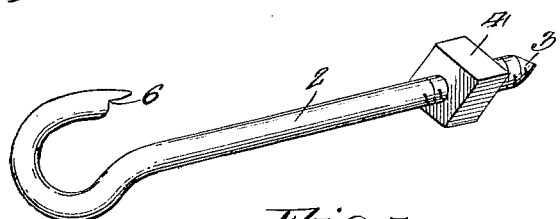
Fig. 4.
WITNESSES
G. M. Spring.
J. Reaney Kelly.
INVENTOR
Robert E. Smith,
Richard Oliver
his Attorney

UNITED STATES PATENT OFFICE.

ROBERT E. SMITH, OF BATTLE CREEK, MICHIGAN.

CLEVIS-HOOK.

1,054,046.  Specification of Letters Patent. Patented Feb. 25, 1913.

Application filed April 24, 1912. Serial No. 692,972.

*To all whom it may concern:*

Be it known that I, ROBERT E. SMITH, a citizen of the United States, residing at Battle Creek, in the county of Calhoun and State of Michigan, have invented new and useful Improvements in Clevis-Hooks, of which the following is a specification.

This invention relates to clevis hooks.

An object of the same is to provide a hook of the above nature which is especially adapted for use in connection with swingletrees, and one which consists of but a few parts, yet it is characterized by elements of strength and lightness to a marked degree.

With the above and other objects in view, my invention relates to such details of construction and the arrangement and combination of the several parts as will be hereinafter described and specifically pointed out in the appended claim.

When describing my invention in detail, reference will be had to the accompanying drawings wherein like characters denote like or corresponding parts throughout the several views, and in which, Figure 1 is a perspective view of my invention showing it attached to an ordinary cross beam. Fig. 2 is a plan view thereof. Fig. 3 is a side elevation, and Fig. 4 is a perspective view.

In the accompanying drawings which illustrate the preferred form of my invention, numeral 1 designates a support such as an ordinary swingletree or cross beam which is as usual pivoted upon the tongue of the vehicle and in connection with which my invention has been illustrated.

My invention consists of a hook or clevis member having a shank 2 provided at one end with screw threads as at 3. The shank 2 extends removably through the support as shown. At the end of the hook 5 is provided a cut-out portion or notch 6 to form a shoulder which abuts against a face of the support so as to prevent the removal of a chain or the equivalent, of which 7 designates a link, and also to form a portion projecting beyond the shoulder to engage a face of the support at a right angle to the face of the support engaged by the shoulder. The shoulder by abutment against the support, it will be noticed, limits the extent of insertion of the shank into the support, whereby the hook is always maintained at the proper extent of projection beyond the support. As to the portion projecting beyond the shoulder, it is to be noted that the same prevents any turning movement or swiveling of the hook member when fastened to the support, whereby said hook member may be fastened readily thereto.

It will be appreciated from the foregoing description that my hook is very simple and that it can be readily attached or detached to or from the support, and that danger of displacement of the link therefrom is obviated.

I desire it to be understood that I may make slight changes in the construction and in the arrangements and combination of the several parts, provided such changes fall within the scope of the sub-joined claim.

Having thus fully described my invention, what I claim as new and desire to secure by Letters Patent is:—

In a device of the character described, in combination with a support, a hook member having a shank extending through said support, and a hook exterior of the support, said hook provided with a shoulder and a projecting member extending beyond said shoulder, said shoulder and projecting member bearing against faces of said support, the shank provided with screw threads thereon and a nut to engage said screw threads to fasten said hook member to said support and thereby firmly clamp the shoulder against the support.

ROBERT E. SMITH.

Witnesses:
N. E. RETALLICK,
EDITH B. GALLOWAY.

Copies of this patent may be obtained for five cents each, by addressing the "Commissioner of Patents, Washington, D. C."